United States Patent Office 3,133,830
Patented May 19, 1964

3,133,830
PROCESS OF FLAMEPROOFING FOAMED POLYSTYRENE
Hellmut Jochinke, Gersthofen, near Augsburg, Germany, assignor to Farbwerke Hoechst Aktiengesellschaft vormals Meister Lucius & Bruning, Frankfurt am Main-Hoechst, Germany, a company of Germany
No Drawing. Filed Sept. 22, 1960, Ser. No. 57,627
Claims priority, application Germany, Sept. 26, 1959
4 Claims. (Cl. 117—137)

The present invention relates to flameproof products of foamed polystyrene and to a process for making them.

It is known that flameproof polystyrene polymers can be obtained by admixing those polymers, before or after polymerization, with halogen compounds or by adding halogen derivatives that participate in the polymerization. Such polymer mixtures must always be prepared in a separate operation before foaming.

It is also known that flameprof properties can be imparted to products of foamed polystyrene by applying thereto a warm, solid, chlorinated paraffin or a dispersion of solid, organic compounds, inter alia high molecular chlorine compounds, such as polyvinyl chloride, which has been prepared with the use of an organic binder. An organic binder must be used in order to permit fixation of the solid chlorine compound on foamed polystyrene.

In order to make flameproof products, it is necessary, calculated on the weight of foamed polystyrene, to use several times the quantity of organic chlorine compound.

I have now found that flameproof properties can be imparted in simple manner to finished foamed polystyrene by coating its surface with antimony trioxide (pigment) and an aqueous emulsion of solid, not crystalline or viscous chlorinated hydrocarbons containing at least 5 carbon atoms, advantageously 10–30 carbon atoms, and at least 40% by weight, for example up to 80% by weight chlorine, said emulsion containing further pigments, if desired. Generally, those chlorinated hydrocarbons are used in which the sum of carbon atoms+chlorine atoms is at least 15. Those substances are sufficiently scarcely volatile so that they do not rapidly evaporate even when heated.

As starting materials for making solid or viscous organic chlorine compounds there may be used aliphatic hydrocarbons as they are obtained in petroleum distillation or by the Fischer-Tropsch synthesis, for example those having a boiling range of between 70° C. and 350° C., or also paraffins which are solid at room temperature, or aromatic hydrocarbons, such as diphenyl or naphthalene. In order to ensure that the surface coating is not sticky, it is advantageous to use those viscous chlorinated hydrocarbons whose viscosity is at least 50,000 centipoises at 20° C. For the purpose of facilitating the preparation of the emulsions, the chlorinated hydrocarbons may be admixed with readily volatile organic solvents, such as aliphatic hydrocarbons, for example hexane, heptane or octane or fractions thereof, for example gasoline boiling between 80° C. and 120° C., or also benzene, toluene, xylene, chlorobenzene, chloroform, carbon tetrachloride or trichloroethylene, which all are added in a proportion such that the foamed polystyrene is not substantially dissolved. As pigments other than antimony trioxide there may be added to those emulsions, for example iron oxides, titanium dioxide or kaolin. Dyestuffs may also be added. The emulsions generally contain antimony trioxide or other pigments in a ratio by weight of between 1:1 and 1:3, calculated on the chlorination products.

The emulsions so prepared can readily be applied, do not substantially dissolve foamed polystyrene, yield a dry surface coating after evaporation of volatile constituents, and are well waterproof. Under the action of fire or heat, the foamed material sinters together whereby the flame-proofing substances are well mixed with the polystyrene. Neither the foamed polystyrene nor the molten mass dropped off continue burning after removal of the flame source provided that the weight of coating composition, which depends on the thickness of the foamed polystyrene article, has been balanced against the weight of polystyrene. This can readily be determined by a preliminary test.

The following examples serve to illustrate the invention, but they are not intended to limit it thereto, the parts being by weight unless otherwise stated:

EXAMPLE 1

*Preparation of Treating Agent*

A homogeneous mixture was prepared from 25 parts of a chlorinated, solid paraffin (chlorine content: 70%; melting range: 65–75° C.), 2 parts stearic acid, and 18 parts gasoline (boiling range: about 80–120° C.). The mixture so obtained was emulsified at about 70° C., while being intensely stirred, with an aqueous solution of 1 part triethanol amine and 5 parts water. An emulsion was obtained into which was introduced gradually a paste that had previously been passed through a dyestuff mill and prepared from 1 part water-soluble methyl-cellulose (for example Tylose SL 100 (registered trademark) of Messrs. Kalle Aktiengesellschaft, Wiesbaden, Germany), 12 parts antimony trioxide and 36 parts water.

The pigment-containing emulsion so obtained had a relatively low viscosity, could be stored for months, and could be diluted with water in any desired ratio.

*Treatment of Foamed Polystyrene*

The coating composition prepared in the manner set forth above was diluted with water in the ratio of 1:1. The resulting dilute emulsion was applied to the surface of the foamed polystyrene article by painting or spraying the article with the emulsion once or repeatedly. The preparation agent dried rapidly in the atmosphere and became solid.

In order to produce a self-extinguishing effect on an article 6 cm. thick of foamed polystyrene, the coating composition was applied in an amount such that the dry coating represented about 40% of the weight of untreated polystyrene foam.

EXAMPLE 2

25 parts of a highly viscous chlorination product of an aliphatic hydrocarbon fraction containing 11–17 carbon atoms and 70% chlorine, and 2 parts stearic acid were stirred at about 70° C. until a homogeneous mixture was obtained, and the whole was emulsified in the manner described in Example 1 with an aqueous solution of 1 part triethanol amine and 5 parts water. The resulting emulsion was then stirred with a paste prepared from 1 part water-soluble methyl-cellulose, 9 parts antimony trioxide, 1 part titanium dioxide and 56 parts water.

In order to impart a self-extinguishing effect to a sheet 2 cm. thick of foamed polystyrene, the coating composition was used in an amount such that the dry coating represented about 30% of the weight of untreated polystyrene.

EXAMPLE 3

25 parts of a highly viscous chlorinated diphenyl containing 60% chlorine, 5 parts light gasoline and 2 parts stearic acid were emulsified with 1 part triethanol amine in 5 parts water. The resulting emulsion was stirred with a paste of 1 part methyl-cellulose and 10 parts antimony trioxide in 51 parts water, and the whole was made in the manner described in Example 2 into a coating composition producing a self-extinguishing effect in foamed polystyrene masses.

I claim:
1. A process for the manufacture of flameproof shaped products of foamed polystyrene which comprises coating shaped products of foamed polystyrene with an aqueous emulsion containing as essential ingredients a non-crystalline chlorinated hydrocarbon of at least 5 carbon atoms and a chlorine content of at least 40% by weight, and antimony trioxide, the ratio by weight between the chlorinated hydrocarbon and the trioxide being between 1:1 and 3:1.

2. A process for the manufacture of flameproof shaped products of foamed polystyrene which comprises coating shaped products of foamed polystyrene with an aqueous emulsion containing as essential ingredients a non-crystalline chlorinated hydrocarbon of a chlorine content of at least 40% by weight, and antimony trioxide in which the sum of the carbon atoms and chlorine atoms is at least 15 the ratio by weight between the chlorinated hydrocarbon and the trioxide being between 1:1 and 3:1.

3. The process of claim 2 wherein the chlorination product contains from 10 to 30 carbon atoms.

4. The process of claim 2, wherein the chlorinated hydrocarbon component has—at a temperature of 20° C.—a viscosity of more than 50,000 centipoises.

References Cited in the file of this patent

UNITED STATES PATENTS

| | | |
|---|---|---|
| 2,427,997 | White | Sept. 23, 1947 |
| 2,469,107 | Dimpfl | May 3, 1949 |
| 2,547,671 | Sostmann et al. | Apr. 3, 1951 |
| 2,938,937 | Shenk | May 31, 1960 |
| 3,006,787 | Blewis et al. | Oct. 31, 1961 |